United States Patent [19]

Skupsky et al.

[11] Patent Number: 5,048,029
[45] Date of Patent: Sep. 10, 1991

[54] SYSTEM FOR OBTAINING SMOOTH LASER BEAMS WHERE INTENSITY VARIATIONS ARE REDUCED BY SPECTRAL DISPERSION OF THE LASER LIGHT (SSD)

[75] Inventors: Stanley Skupsky; Terrance J. Kessler; Robert W. Short; Stephen Craxton, all of Rochester; Samuel A. Letzring, Honeoye Falls; John Soures, Pittsford, all of N.Y.

[73] Assignee: The University of Rochester, Rochester, N.Y.

[21] Appl. No.: 557,273

[22] Filed: Jul. 24, 1990

[51] Int. Cl.$^5$ ............................................. H01S 3/13
[52] U.S. Cl. ...................................... 372/26; 372/31; 372/102; 372/106
[58] Field of Search .................... 372/26, 29, 30, 102, 372/21, 22, 106, 31

[56] References Cited

U.S. PATENT DOCUMENTS 4,961,195 10/1990 Skupsky et al. ...................... 372/31

OTHER PUBLICATIONS

R. S. Craxton, S. Skupsky, J. M. Soures, CLE Review, vol. 36, pp. 158–172, Jul.–Sept. 1988.

J. Buakenberg et al., IEEE J. Quant. Elect., QE-17 9, 1620 (1628), Sep. 1981.

Primary Examiner—James W. Davie
Attorney, Agent, or Firm—Martin Lukacher

[57] ABSTRACT

In an SSD (smoothing by spectral dispersion) system which reduces the time-averaged spatial variations in intensity of the laser light to provide uniform illumination of a laser fusion target, an electro-optic phase modulator through which a laser beam passes produces a broadband output beam by imposing a frequency modulated bandwidth on the laser beam. A grating provides spatial and angular spectral dispersion of the beam. Due to the phase modulation, the frequencies ("colors") cycle across the beam. The dispersed beam may be amplified and frequency converted (e.g., tripled) in a plurality of beam lines. A distributed phase plate (DPP) in each line is irradiated by the spectrally dispersed beam and the beam is focused on the target where a smooth (uniform intensity) pattern is produced. The color cycling enhances smoothing and the use of a frequency modulated laser pulse prevents the formation of high intensity spikes which could damage the laser medium in the power amplifiers.

20 Claims, 6 Drawing Sheets

SYSTEM FOR OBTAINING SMOOTH LASER BEAMS WHERE INTENSITY VARIATIONS ARE REDUCED BY SPECTRAL DISPERSION OF THE LASER LIGHT (SSD)

The U.S. Government has rights in this invention by virtue of an agreement with the U.S. Department of Energy, Office of Inertial Fusion, DE-FC08-85DP40200.

BACKGROUND OF THE INVENTION

The present invention relates to systems for smoothing by spectral dispersion (SSD) of laser light, and particularly to systems for generating and spectrally dispersing broad-bandwidth light onto a phase plate having different elements which provide relative phase delays. The focused intensity pattern of the laser light then varies in time according to the frequency differences between the portions (beamlets) of the light incident on the elements to produce a time averaged intensity which will smooth.

This invention is especially suitable for use in providing laser beams which irradiate laser fusion targets wherein uniform absorption of laser light results in high-density compression, and avoids the generation of hot spot intensity non-uniformities. The invention will also be found useful wherever variations in the intensity of a laser beam are not desired, for instance, when such variations can cause damage to the material through which the laser is propagating (and this damage is the result of the time integrated beam intensity).

This invention is an improvement over the invention of U.S. Pat. Application Ser. No. 228,131 filed Aug. 3, 1988 and assigned to the same assignee as this application. The prior application describes the general concepts of SSD. The subject matter of the prior application is also described in an article by R. S. Craxton, S. Skupsky and J. M. Soures, LLE Review, Volume 36, page 158 (1988).

The SSD concept is based upon the interference of laser light in a plane where, for example, a laser fusion target may be located. Consider the interference between rays from different elements of a phase plate which may be a distributed phase plate (DDP). In the target plane the combined electric fields from two exemplary rays are $$E = E_1 e^{i(kL_1 + \phi_1 - \omega t)} + E_2 e^{i(kL_2 + \phi_2 - \omega t)}, \quad (1)$$

where the amplitudes are of the diffraction limited form $E_1$ approximately equal to $E_2$, approximately equal to $\sin(y)/y$, and $\phi_1$ and $\phi_2$ are the phases of the rays (including those imposed by the phase plate). y is a transverse direction to the path of the light. For simplicity, if $E_1$ equals $E_2$, then the intensity variation is $$I = |E|^2 = 2E_1^2 + 2E_2^2 \cos[k(L_1 - L_2) + (\phi_1 - \phi_2)], \quad (2)$$

which results in high-intensity fluctuations in the transverse (y) direction as the path length difference ($L_1$ minus $L_2$) from the phase plate to the target plane changes. If the rays have different frequencies and wave numbers ($\omega_1$, $k_1$) and ($\omega_2$, $k_2$), the intensity becomes $$I = 2E_1^2 + 2E_1^2 \cos[k_1 L_1 - k_2 L_2 + (\phi_1 - \phi_2) + (\omega_1 - \omega_2)t]. \quad (3)$$

At any instant of time, the intensity pattern will still have high intensity modulations but they will fluctuate in time according to the frequency difference. When averaged over time, the interference term will approach 0 as $1/(\omega_1 - \omega_2)t$, and the intensity will approach the smooth diffraction limited $\mathrm{sinc}^2$ envelope.

As described in the prior application and in the above-cited LLE Review article, it is necessary to assure that a plurality of frequencies are contained in the beam incident on the phase plate. Problems faced in practical implementation of an SSD system include (1) generation of bandwidth containing the plurality of frequencies that will not damage the laser glass or other optical elements in the system with high intensity spikes; (2) dispersion of the bandwidth frequencies across the DPP elements; (3) prevention of the distortion of the temporal profile of the beam; and (4) obtaining the smooth intensity pattern and improved uniformity during a sufficiently small averaging time to be useful in laser fusion and other applications.

Another constraint on SSD is to accommodate high-efficiency frequency tripling of the broadband light. Current laser fusion techniques use frequency tripled infrared (IR) light to take advantage of the increased collisional laser absorption and higher hydrodynamic implosion efficiency that is possible at shorter wavelengths. However, high efficiency tripling can only be achieved for a given orientation of the tripling crystals over a narrow spread in wave lengths (for example approximately one Angstrom in the IR). As described in the prior application and LLE review article, this can be accomplished by spectral dispersion of the beam in one direction and with cylindrical lenses to impose the required angular spread. It has, however, been difficult to obtain a linear spectral (wavelength) dispersion so as to obtain high efficiency frequency tripling.

SUMMARY OF THE INVENTION

Accordingly, it is the principal object of the present invention to provide an improved SSD system.

It is another object of the present invention to provide an improved SSD system which overcomes the problems related to the practical implementation thereof which are discussed above.

It is a still further object of the present invention to provide an improved SSD system in which an interference producing element, such as a DPP, is irradiated by different frequencies at each instant of time thereby rapidly obtaining improved uniformity in laser light illuminating a target plane.

In accordance with the invention, a laser beam is generated by a laser oscillator or other driver in the form of a short (for example, nanosecond or subnanosecond range) pulse. A broad band beam containing a plurality of frequencies is formed as a frequency modulated pulse which prevents the formation of high-intensity spikes that could damage laser glass as might otherwise occur of the bandwidth were to include amplitude modulation. This frequency modulation is produced by passing the laser beam through an electro-optic (EO) crystal with an imposed oscillating electric field.

The phase modulated electric field of the laser beam is of the form $$E(t) = E_o(t) e^{i\phi(t)} \quad (4)$$

where the entire effect of bandwidth on the original field $E_0$ is contained in the time varying phase. The bandwith associated with the time variation of $E_0(t)$ is negligble for typical nanosecond pulses. The laser intensity varies as $$|E(t)|^2 = |E_o(t)|^2 . \tag{5}$$

and contains no additional high intensity spikes from the interference between different frequencies. This would not be true for a chaotic form of bandwidth in which different modes have random phases, i.e., $$E(t) = \Sigma a_n e^{i(\omega_n t + \phi_n)} \tag{6}$$

where $\phi_n$ is random.

By passing the laser beam through an EO crystal, the index of which is changed by an imposed oscillating electric field, the effect is to produce a laser electric field of the form:

$$E(t) = E_o e^{i\omega t + i\delta \sin \omega_m t}, \tag{7}$$

where $\delta$ and $\omega_m$ are the modulation amplitude and angular frequency, respectively, of the EO device and $\omega$ is the fundamental angular frequency of the laser beam. By expanding the term in a Fourier series (using techniques described by A. Yariv, Quantum Electronics, 2nd ed., Section 14.4 (Wiley, N.Y., 1975)), the laser electric field becomes $$E(t) = E_o \sum_{-\infty}^{\infty} J_n(\delta) \, e^{i(\omega + n\omega m)t}, \tag{8}$$

The beam contains frequency side bands in increments of $\omega_m$ which extend out to approximately plus or minus delta $\omega_m$ at which point the mode amplitudes $(J_n)$ rapidly approach zero, i.e., the frequency spread is well approximated by $$\Delta \nu = 2\delta \nu_m \tag{9}$$

where $\Delta \nu$ is the change in frequency, $\nu_m$ being the modulation frequency of the EO device.

In order to irradiate the phase plate (the DPP elements) by different frequencies at each instance of time, angular dispersion is added to the phase modulated beam by means of a diffraction grating. This results in the desired variation of frequency across the beam. As discussed hereinafter, the diffraction grating can also provide the required angular spread for efficient frequency tripling. The effect of the grating may be better understood by modeling the light emerging from the grating as plane waves with the amplitude of each frequency component given by Equation 8 above. Then the spectrally dispersed beam is described by $$E_D = E_o \sum_n J_n(\delta) \, e^{i(\omega + n\omega m)t - i k_n \cdot R}, \tag{10}$$

where $$k_n \cdot R = \frac{1}{c} (\omega + n\omega_m)[Z\cos\theta_n + Y\sin\theta_n]. \tag{11}$$

Z and Y are orthogonal axes, the Z axis is along the propagation direction of the fundamental frequency (n equals 0), and the dispersion angle for the nth haromic, $\theta_n$, is given in terms of the grating dispersion, $\Delta\theta/\Delta\lambda$:

$$\theta_n = \frac{d\theta}{d\omega} \, n\omega_m = -\frac{\Delta\theta}{\Delta\lambda} \, \frac{\lambda}{\omega} \, n\omega_m. \tag{12}$$

Keeping terms linear in the small quantity, $\omega_m/\omega$, Equation (10) becomes $$E_D(Z,Y,t) \approx \tag{13}$$

$$E_o \, e^{i\omega t - ikZ} \sum_n J_n(\delta) \exp\left[ in\omega_m \left( t - Z/c + \frac{\Delta\theta}{\Delta\lambda} \, \frac{\lambda}{c} \, Y \right) \right].$$

which can be recombined as $$E_D = E_o e^{i\omega t - ikZ + i\delta \sin [\omega_m(t - Z/c) + \alpha Y]}, \tag{14}$$

where $$\alpha = 2\pi \, \frac{\Delta\theta}{\Delta\lambda} \, \frac{\omega_m}{\omega} . \tag{15}$$

From the foregoing it will be apparent that the beam is still purely phase modulated after dispersion and without significant amplitude modulation if the beam propagates over distances typically less than tens of meters. The instantaneous frequency now varies across the beam (across the beam aperture) with a wave length of $k2\pi/\alpha$. Then the full range of the modulated spectrum is present simultaneously across the phase plate with different elements and areas of the phase plate illuminated by different frequencies. Even though the instantaneous frequency varies only in one direction, the phase plate can produce substantial improvement in uniformity of the illumination on target because of the multiplicity of frequencies present simultaneously on the different areas of the plate.

The frequency ("color") variation across the beam can be viewed as the result of a spatially varying time delay across the beam. From Equation (14) above, the total time delay is seen to be proportional to the grating dispersion and beam diameter $$t_D = \left( D \frac{\Delta\theta}{\Delta\lambda} \right) \frac{\lambda}{c} . \tag{16}$$

The quantity in parentheses is constant throughout the laser system because the beam divergence changes inversely with diameter.

The phase modulation, however, imposes a finite y-dependent time delay which changes the temporal shape of the pulse envelope of the laser beam, i.e. the amplitude function $E_0(t)$ becomes $E_0(t$ minus $\alpha Y/\omega_m)$ after dispersion. The result is a lengthening of the pulse and an intensity variation across the beam aperture.

In accordance with the invention, another grating is placed ahead of (upstream of) the modulator and corrects the amplitude time delay without affecting angular dispersion of the spectrum. In other words, the upstream grating introduces a time delay in the amplitude of $E_0(t)$ opposite to the one that will be induced by the grating after the EO modulator. The time delayed beam then passes through the modulator where the bandwidth is imposed. The grating after the EO modulator serves a triple purpose: (1) it restores the been amplitude to its correct temporal shape; (2) it imposes the spatial frequency variation across the beam that is required for SSD; and (3) it imposes a spectral dispersion that can be utilized for high-efficiency frequency conversion.

Briefly described therefore, the invention provides a system for smoothing intensity variations in a laser beam by spectral dispersion of the beam by the use of the following combination of elements: (a) means for generating a laser beam; (b) means for phase modulating the beam to provide a phase modulated output beam having a plurality of frequencies; (c) means for angularly dispersing said phase modulated beam to produce a spectrally dispersed beam having the plurality of frequencies; and (d) means in the path of the dispersed beam for combining portions of the beam of different frequency to provide an output beam, smoothed in intensity variation.

BRIEF DESCRIPTION OF THE DRAWINGS

The foregoing and other objects, features and advantages of the invention as well as a presently preferred embodiment thereof, will become more apparent from a reading of the following description in connection with the accompanying drawings.

DESCRIPTION OF THE PREFERRED EMBODIMENTS

Figure 4:
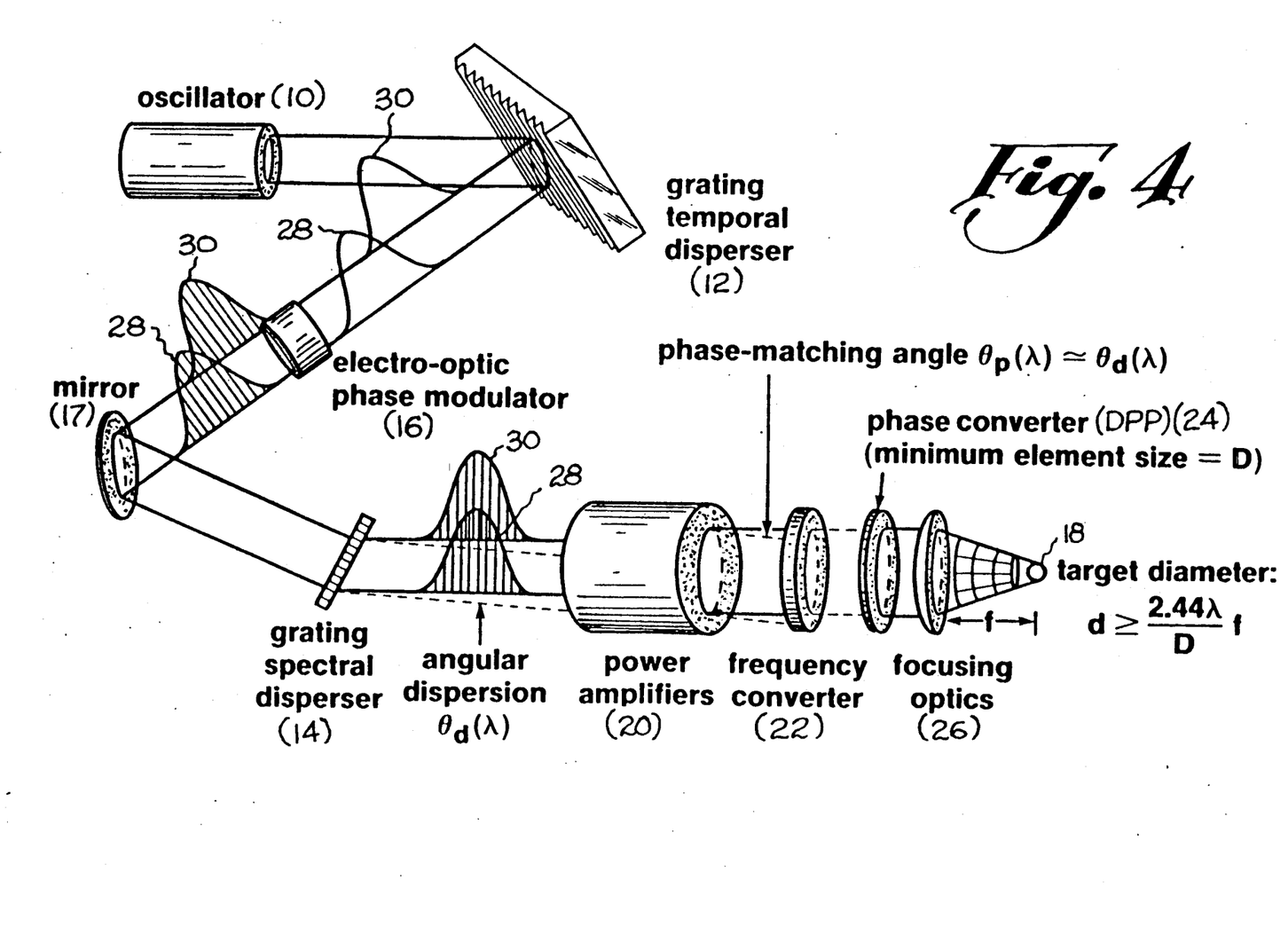
FIG. 4 is a schematic, perspective view of an SSD system embodying the invention.

Referring first to FIG. 4, there is shown a laser oscillator 10 which provides a beam of laser pulse. This oscillator may be of the type described in the referenced application and LLE review article. This laser oscillator, a temporal disperser grating 12 and a spectral disperser grating 14, between which an electro-optic Phase modulator 16 and the bending mirror 17 are located, are contained in the driver line of a multi-beam-line laser system which irradiates a laser fusion target 18. Only one of a plurality (for example 24) beam lines is shown in FIG. 4. The angularly dispersed beam from the spectral disperser grating 14 is split to drive each of the beam lines. The beam lines consist of power amplifiers 20, frequency converter (one or more crystals which double and triple (in this embodiment) or even quadruple the frequency of the beam) 22, a phase converter or plate (a DPP) 24, and a lens system (focusing optics) 26 which focuses the beam from the beam line onto the target 18. The beam lines are similar to those used in the Omega system which is in place at the Laboratory of Laser Energetics of the University of Rochester and is described in the following publication. J. Bunkenberg et al., "The Omega High Power Phosphate Glass System: Design and Performance", *IEEE J. Quant. Electr.*, Vol. QE-17, No. 9, p. 1620 (1981).

The system shown in FIG. 4 is an SSD system as may be implemented on a fusion laser of the Omega type. The gratings 12 and 14 are matched in the sense that the lateral time delay across the beam aperture induced by the spectral disperser grating 14 is exactly removed by the temporal disperser grating 12. The temporal dispersion is the y dependent time delay discussed above. This time delay is shown by the pulses 28 preceding the laser pulses 30 in FIG. 4 which illustrates the finite pulse envelope of the beam.

Figure 1:
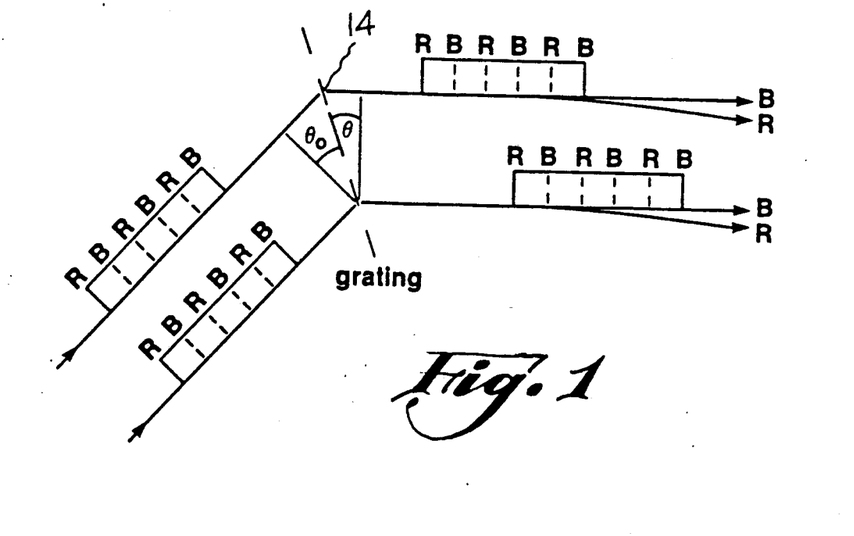
FIG. 1 is a schematic view of the modulated beam showing how the diffraction grating introduces spectral spread (angular dispersion of the spectrum). The "R" (red) and "B" (blue) labels respectively show the largest wave length (lowest frequency) of the beam and the smallest wave length (highest frequency) of the beam. It will be appreciated that these beams may not actually be red or blue but are separated by a frequency spread due to the modulation of the beam (the bandwidth spread may, for example, be approximately 10 Angstroms).
Figure 2:
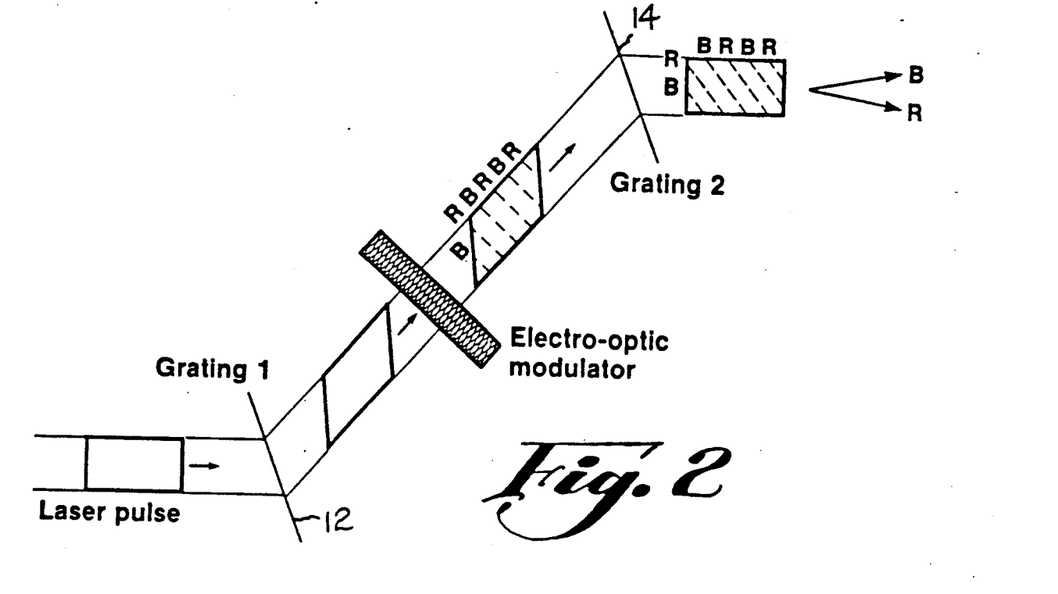
FIG. 2 is a schematic diagram showing the two grating configuration wherein grating 1 introduces a predelay that compensates for the time delay in beam amplitude produced by grating 2, thereby correcting the amplitude time delay and providing a dispersing configuration that will not significantly distort the temporal profile of the output beam (the dashed lines are not wave fronts but contours of constant color).

The effect is also shown in FIG. 1 which illustrates the modulated beam incident on the spectral disperser grating 14. This lengthening of the pulse and an accompanying intensity variation across the beam aperture is corrected by inserting the temporal disperser grating 12 before the EO modulator 16 as shown in FIG. 2. When the beam passes through the temporal disperser grating, its residual bandwidth will be dispersed, but this dispersion is a negligible effect for a typical bandwidth limited laser beam as produced by the oscillator 10 and is corrected by the spectral disperser grating 14. The main effect of the temporal disperser grating 12 is to introduce a time delay in the amplitude $E_0(t)$ opposite to the one that will be induced by the spectral disperser grating 14. The time delayed beam then passes through the EO modulator 16. The spectral disperser grating 14 serves a triple purpose as shown in FIG. 2, namely: (1) it restores the beam amplitude to its correct temporal shape; (2) it imposes the spatial frequency variation across the beam that is required for SSD; and (3) it imposes a spectral conversion that can be utilized for high-efficiency frequency tripling.

By way of example, consider a grating configuration that will disperse a two Angstrom bandwidth over a 200 microradian angular dispersion at the focusing optics (26). For the Omega laser, the gratings are at a stage in the driver line where the beam is 2.9 times smaller than at the focusing optics (26). The beams are expanded during and after the power amplifier stages. Since the beam divergence is inversely proportional to beam diameter, the imposed dispersion is 2.9 times larger, i.e.

$$\Delta\theta/\Delta\lambda = 2.9 \times (200\mu\text{rad}/2\text{Å}) \tag{17}$$

The grating dispersion in the first order is given by (according to M. Born and E. Wolf, Principles of Optics, 6th ed., pp. 403–406 [Pergamon, N.Y., 1980])

$$\frac{\Delta\theta}{\Delta\lambda} = \frac{1}{d\cos\theta}, \tag{18}$$

where d is the spacing between grooves of the grating and $\theta$ is the angle between the transmitted beam and the normal to the grating. See FIG. 1. The incident and exit angles are related by the grating equation.

$$|\sin\theta_o + \sin\theta| = \frac{\lambda}{d}. \tag{19}$$

To keep the beam cross section circular. $\theta_0$ equals $\theta$, yielding $$\tan\theta = \tfrac{1}{2}\lambda\left(\frac{\Delta\theta}{\Delta\lambda}\right) \tag{20}$$

and $$d = \left[\left(\frac{\Delta\lambda}{\Delta\theta}\right)^2 + \tfrac{1}{4}\lambda^2\right]^{\tfrac{1}{2}}. \tag{21}$$

Using the parameters for the Omega laser fusion system, namely $$\Delta\theta/\Delta\lambda = 290 \ \mu\text{rad/Å} \tag{22}$$

and $\lambda$ equals 1.054 micrometers, the grating angle $\theta$ equals 57° and the line spacing d equals 0.63 micrometers. The maximum length L of the grating is determined in terms of the beam diamet $D_g$ at the grating (58 mm):

$$L = D_g/\cos\theta, \tag{23}$$

yielding L equals 10.6 cm.

FIG. 2 illustrates that both gratings are transmission gratings. However, a reflection grating can be used for either grating, e.g., for the temporal disperser grating 12 as shown in FIG. 4.

The electro-optic phase modulator 16 modulates the beam as shown in Equations (7) and (8). The wavelength spread produced by the electro-optic phase modulator for 1.054 micrometer wave length laser energy from the oscillator 10 follows from Equation (9) and is $$\Delta\lambda(\text{Å}) = \Delta\gamma(GH_2)\delta/13.5 \tag{24}$$

The instantaneous frequency of the laser energy now varies across the beam with a wave length of $2\pi/\alpha$ (See Equation (5)). If this is smaller than the beam diameter, then the full range of modulated spectrum is present simultaneously across the DPP 24 with different areas of the DPP illuminated by different frequencies. Although the instantaneous frequency only varies in one direction, it produces a substantial improvement in uniformity. The color cycling across the beam provides for this improvement in uniformity.

Figure 3:
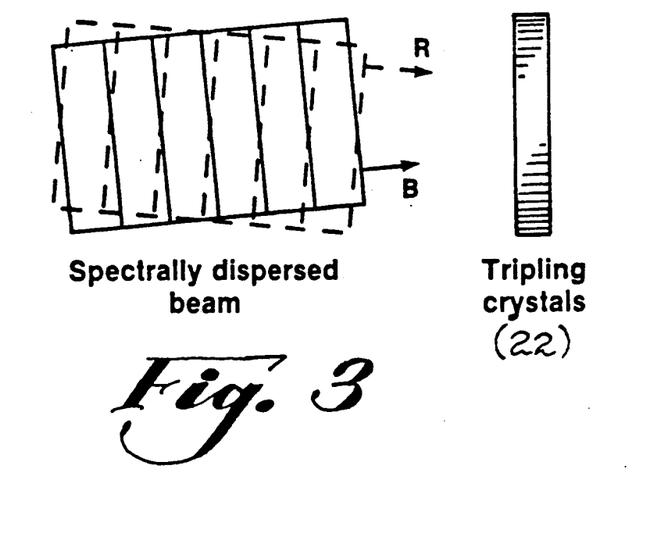
FIG. 3 is a schematic diagram illustrating high frequency tripling of the broadband width light by angular spectral dispersion.

Referring to FIG. 3, it is shown because of the time delay across the grating that if the modulation time $\tau$ (equals $1/\nu_m$) is shorter than the time delay $t_D$ (or $\alpha D$ greater than $2\pi$), then all the colors will cycle across the beam aperture more than once at each instant in time. During a half cycle of the modulation frequency, there is one complete sample of the entire bandwidth presented at the DPP. Thus, instead of the "red-blue" variation being distributed from one end of the DPP to the other, it is distributed over smaller regions so that the nearest elements of the DPP have a larger frequency difference and their average interference pattern will smooth in a shorter time. For instance, with equals $\tau$ equals $t_d/3$, the smoothing time for nearest neighboring elements is 3 times shorter than if there had been only one color cycle.

To determine the relation between the number of color cycles $N_c$ and the EO modulator and grating parameters, it will be seen that $$N_c = t_D\nu_m, \tag{25}$$

with $t_d$ given by Equation (16). Rewriting Equation (16) in terms of the frequency spread $$\Delta\nu = \Delta\lambda c/\lambda^2 \tag{26}$$

and using $$\Delta\nu = 2\delta\nu_m \tag{27}$$

$N_c$ becomes $$N_c = \frac{D\theta_{FW}}{2\lambda\delta}. \tag{28}$$

For the example of the two Angstrom bandwidth and wavelength of 1.054 micrometers and modulation frequency $\nu_m$ of 2.5 GHz, $\Delta\nu$ equals 60 GHz and $\delta$ equals 12. Using parameters evaluated at the final focusing optics 26 (FIG. 4), D equals 17 cm and $\theta_{FW}$ equals 200 microradians, the number of color cycles is $N_c$ equals 1.4. The entire bandwidth is displayed across the beam aperture approximately 3 times.

Figure 6:
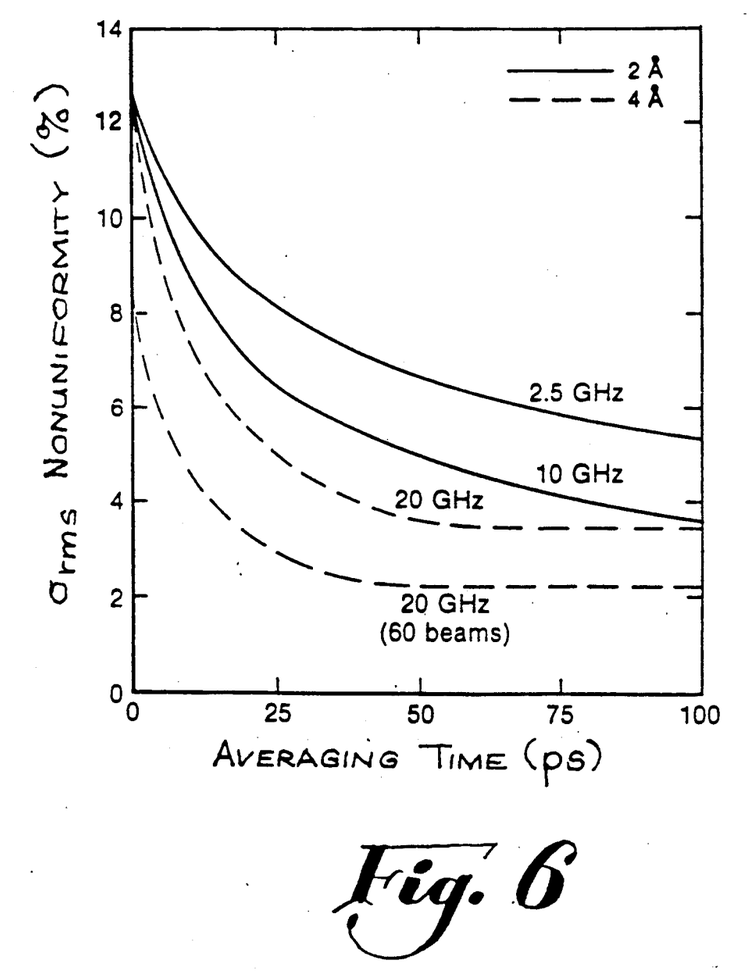
FIG. 6 is a series of plots showing radiation non-uniformity on a target in a target plane using the SSD system, as a function of averaging time and showing the effects of increasing the modulation frequency, bandwidth and number of beams. The curves show the effect of increasing the modulation frequency from 2.5 to 10 GHz for a 2 Angstrom bandwidth, the effect of increasing the bandwidth to 4 Angstroms and doubling the modulation frequency to 20 GHz, and also the effect of increasing the number of beams from 24 to 60.

The improvement in the radiation uniformity available on target is illustrated in FIG. 6 which shows the radiation nonuniformity on target using the SSD system as a function of averaging time and shows the effects of increasing the modulation frequency, bandwidth and number of beams. All of the curves, except where indicated are for 24 beams. The rms non-uniformity $\sigma_{rms}$ decreases as a function of the averaging time. Improvement is shown possible by increasing the modulation frequency from 2.5 GHz to 10 GHz at a two Angstorm bandwidth. Increasing the bandwidth to 4 Angstroms together with doubling the modulation frequency cuts the smoothing time in half, with non-uniformity asymptoting to 3.5 percent at 50 picoseconds. Increasing the number of beams to 60 leads to another reduction in non-uniformity by almost a factor of 2.

Figure 5:
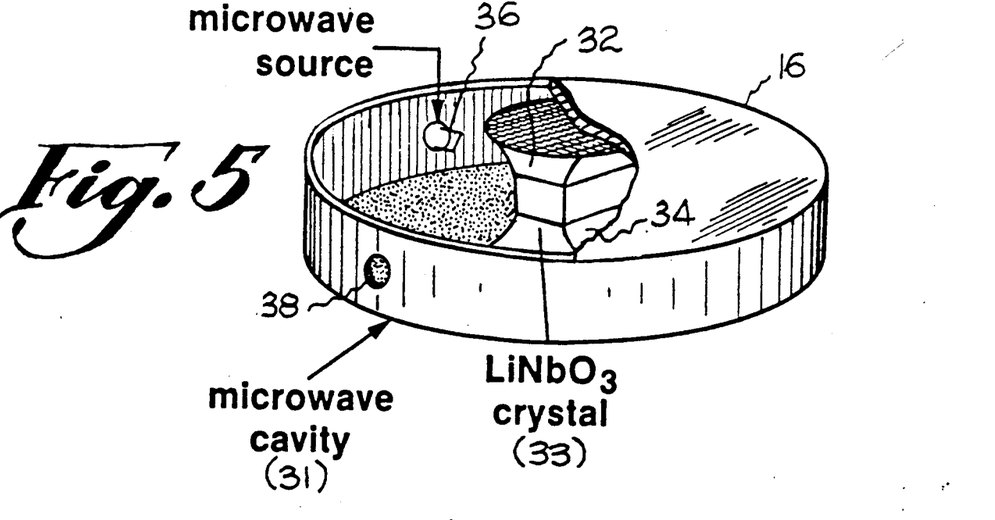
FIG. 5 is a perspective view, partially broken away and showing the EO modulator which is used in the system of FIG. 5

As shown in FIG. 5, the EO modulator 16 is a microwave phase modulator which impresses the bandwidth on the laser beam. It is constituted of a resonant microwave cavity 31 containing a rectangular crystal 30 of lithium niobate. The crystal is centered under re-entrant posts 32 and 34 of the cavity 31. Microwave power is fed into the cavity through a sidewall mounted loop 36 of sufficiently small dimension as not to spoil the Q of the cavity, which defined on the basis of the half power points of the resonant frequency is in excess of 10,000. The RF power may be approximately 2 milliwatts to achieve a 10 kv electric field across the crystal 30. The laser beam passes through the cavity via an opening 38 and thence through the crystal 30 and out of the cavity through an opening (not shown) diametrically opposite the opening 38.

Referring to FIG. 3, it is shown how high efficiency frequency tripling is obtained by matching the spectral angular dispersion imposed by the grating 14 to the angular dependence of the conversion crystals 22. Each frequency component passes through the tripling crystals at its phase matching angle. This technique is applied for spectral dispersion in a single direction along the angle sensitive direction of the tripling crystals 22. The separation of colors is grossly exaggerated in FIG. 3. In practice, the angular spread may be 200 microradians.

The maximum conversion efficiency $\eta_0$ for a beam of constant intensity is degraded in the high conversion regime ($\eta_0$ equals approximately 0.9) roughly according to the following equation. See also the LLE review article by Craxton, Skupsky and Soures, cited above, and an article by R. S. Craxton, et al., IEEE J. Quantum Electronics QE-17, 1782 (1981).

$$\eta = \eta_0[1 - 0.1(\delta\theta/\delta\theta_{90} + \delta\lambda/\delta\lambda_{90})^2]. \qquad (29)$$

where $\delta\theta$ is the deviation of the beam from phase matching measured in air and $\delta\lambda$ is the deviation of the fundamental wavelength. For 1.6 cm crystals, $(\delta\theta)_{90}$ equals 100 microradions, $(\delta\lambda)_{90}$ equals 0.6 Angstroms and $\theta_0$ equals 0.9 is obtained at 1 GW/cm$^2$ (where the average over a temporal Gaussian is 0.75).

The spectral angular divergence imposed in the driver (and appearing at the output of the spectral disperser grating 14) propagates through the remainder of the laser chain and through each of the beam lines (the power amplifiers 20, the frequency converters 22 and the DPPs 24 thereof). In order to prevent the spread in the focused beam at the target plane (on the target 18) from being larger than about half the target diameter, $D_T$ $$F\theta_{FW} \lesssim \tfrac{1}{2} D_T. \qquad (30)$$

where F is the focal length and $\theta_{FW}$ is the full-angle beam spectral divergence. In the Omega fusion laser system F is approximately equal to 60 cm and $D_T$ is approximately equal to 250 micrometers. Thus, the divergence at the final focusing lens of the optics 26 (FIG. 4) is approximately 200 microradians.

Figure 7:
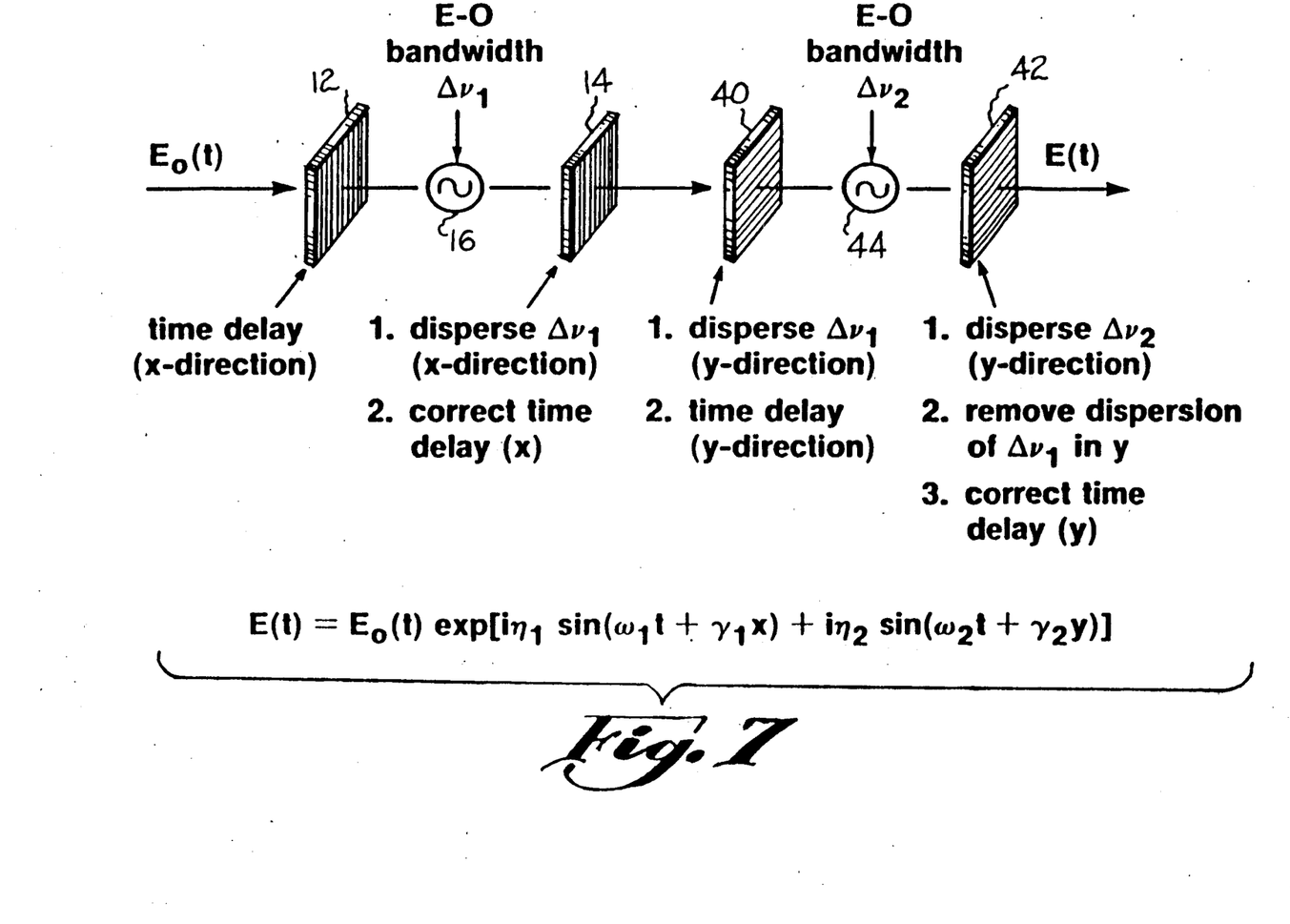
FIG. 7 is a schematic diagram of the part of the system which provides dispersion and modulation showing a second grating pair and modulator for providing two dimensional (x and y) spectral and angular dispersion.
Figure 8:
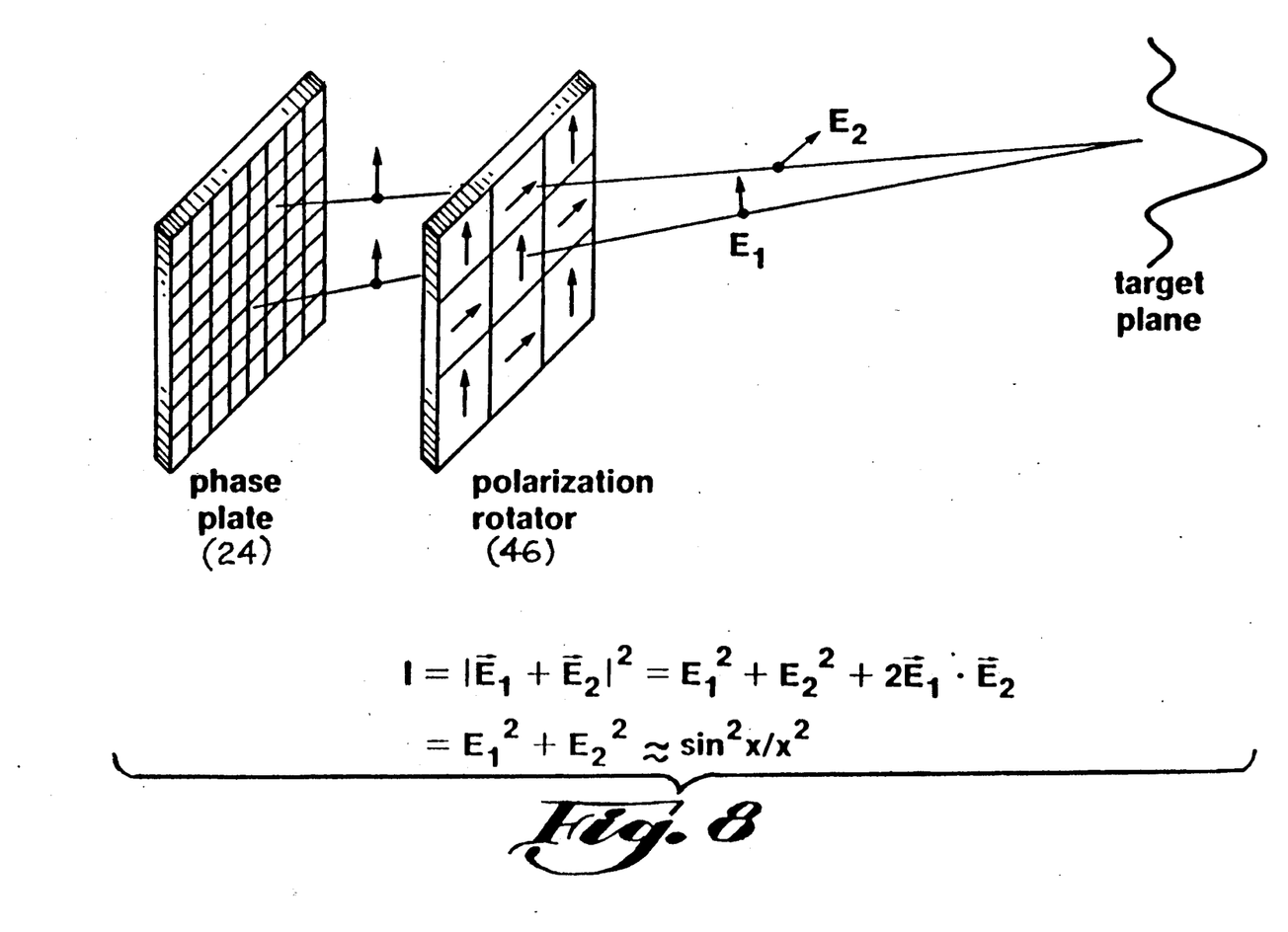
FIG. 8 is a schematic diagram of the part of the system which provides the laser beam on target showing a DPP and polarization rotator for reducing interference structure on target.

Two examples of enhancements to this invention for obtaining additional beam smoothing are shown in FIGS. 7 and 8. FIG. 7 shows the above described gratings 12 and 14 and modulator 16 which introduce spectral, angular dispersion in a first (e.g., the X direction). Angular dispersion in the second (e.g., the Y) is accomplished using an additional EO modulator 44 and two additional gratings 40 and 42. The laser electric field is shown in FIG. 7, where $\eta$ is the EO modulation amplitude and $\Delta\nu_1 = \eta_1\omega_1/\pi$ and $\Delta\nu_2 = \eta_2\omega_2/\pi$.

FIG. 8 shows a multi-element polarization rotator 46 which has adjacent elements providing orthogonal polarizations of the beam from the DPP 24. The interference structure is further reduced by rotating the polarization of different parts of the beam (using, for instance, birefringent material in the elements of the rotator 46). The interference structure is reduced because beamlets with perpendicular polarizations will not interfere. The equation in FIG. 8 shows the effect of the polarization rotator on two beamlets of electric field $E_1$ and $E_2$, producing perpendicular polarization.

From the foregoing description, it will be apparent that there has been provided an improved SSD system for controlling the intensity of the laser energy at a target. Variations and modifications of the herein described system, within the scope of the invention, will undoubtedly suggest themselves to those skilled in the art. Accordingly, the foregoing description should be taken as illustrative and not in a limiting sense.

We claim:

1. A system for smoothing intensity variations in a laser beam by spectral dispersion of the beam which comPrises means for generating a laser beam, means for phase modulating said beam to provide a phase modulated beam, means for angularly dispersing said phase modulated beam to provide an angularly and spectrally dispersed beam having a plurality of frequencies, and means in the path of said dispersed beam for combining portions of said beam of different frequencies to provide an output beam smoothed in intensity variation.

2. The system according to claim 1 wherein said phase modulation means comprises an electro-optic phase modulator.

3. The system according to claim 2 wherein said phase modulator comprises an electro-optic crystal through which said beam passes and means for applying an RF voltage in the GHz frequency range to said crystal.

4. The system according to claim 3 wherein said modulator comprises means providing a microwave cavity, said crystal being disposed in said cavity, and means for coupling microwaves of said frequency range and of sufficient power to said crystal to modulate said beam passing therethrough.

5. The system according to claim 1 wherein said generating means includes a laser oscillator providing laser pulses.

6. The system according to claim 1 wherein said angular dispersing means is a first diffraction grating.

7. The system according to claim 6 further comprising a second diffraction grating, said first and second gratings being disposed on opposite sides of said modulating means, said first grating being disposed between said modulating means and said combining means, said second grating presenting a time delay across said beam equal and opposite to the time delay imposed by said first grating.

8. The system according to claim 7 further comprising frequency conversion means disposed in the path of said angularly dispersed beam.

9. The system according to claim 8 wherein said frequency conversion means comprise one or more nonlinear optical crystals used to double, triple or quadruple the frequency of said angularly dispersed beam.

10. The system according to claim 8 wherein said frequency conversion means includes nonlinear optical crystals having different phase matching angles for different laser frequencies, said first grating having an angular dispersion such that each of said plurality of frequencies passes through said crystals approximately at its phase matching angle.

11. The system according to claim 7 further comprising laser power amplifier means for amplifying said angularly dispersed beam.

12. The system according to claim 11 further comprising means in the path of said beam from said amplifier means for tripling the frequency of said beam.

13. The system according to claim 1 wherein said combining means comprises a distributed phase plate on which said dispersed beam is incident.

14. The system according to claim 1 wherein said combining means comprises means for focusing said dispersed beam to reduce the diameter thereof.

15. The system according to claim 1 wherein said first mentioned phase modulating and angularly dispersing means spectrally and angularly disperse said beam in a first direction and further comprising second phase modulating means and means for angularly dispersing said beam disposed in tandem with said first mentioned phase modulating and angular dispersing means for spectrally and angularly dispersing said beam in a second direction.

16. The system according to claim 7 further comprising second modulating means, third and fourth gratings disposed on opposite sides of said second modulating means, said first and second gratings having lines disposed in a first direction, said third and fourth gratings having lines disposed in a second direction, said third and fourth gratings and second modulating means being disposed in the path of said beam between said first grating and said interference causing means, said third grating presenting a time delay across said beam opposite to the time delay imposed by said fourth grating.

17. The system according to claim 1 wherein said combining means comprises a phase plate and a polarization rotator.

18. The system according to claim 1 wherein said phase plate is a DPP and said polarization rotator has a plurality of elements in a matrix wherein adjacent elements impose orthogonal polarizations on said beam.

19. The system according to claim 1 wherein said combining means includes a phase plate which separates said dispersed beam into beamlets which are in an overlapping relationship on a target.

20. The system according to claim 19 wherein said phase plate is a DPP.

* * * * *